US011279887B2

(12) United States Patent
Talley (10) Patent No.: US 11,279,887 B2
(45) Date of Patent: Mar. 22, 2022

(54) TREATMENT COMPOSITION AND METHOD FOR REDUCING VISCOSITY OF HYDROCARBONS

(71) Applicant: WellRenew, LLC, Lafayette, LA (US)

(72) Inventor: Charles Bullick Talley, Aurora, CO (US)

(73) Assignee: WELLRENEW, LLC, Lafayette, LA (US)

( * ) Notice: Subject to any disclaimer, the term of this patent is extended or adjusted under 35 U.S.C. 154(b) by 98 days.

(21) Appl. No.: 16/863,145

(22) Filed: Apr. 30, 2020

(65) Prior Publication Data

US 2021/0340448 A1 Nov. 4, 2021

(51) Int. Cl.
C09K 8/524 (2006.01)
C10G 33/04 (2006.01)
C10G 75/04 (2006.01)

(52) U.S. Cl.
CPC .............. *C10G 33/04* (2013.01); *C09K 8/524* (2013.01); *C10G 75/04* (2013.01); *C10G 2300/302* (2013.01); *C10G 2300/304* (2013.01)

(58) Field of Classification Search
CPC ... C09K 8/524; Y10S 507/929; Y10S 507/93; Y10S 507/931
See application file for complete search history.

(56) References Cited

U.S. PATENT DOCUMENTS 4,359,391 A 11/1982 Salathiel et al.
5,340,493 A 8/1994 Principato
6,173,776 B1 1/2001 Furman
6,235,698 B1 5/2001 Vlasblom
6,369,016 B1 4/2002 Vlasblom
8,871,701 B2 10/2014 Bierganns
8,900,332 B2 12/2014 Lee
8,986,461 B2 3/2015 Hischier
(Continued)

FOREIGN PATENT DOCUMENTS

DE 3537619 A1 4/1987
DE 4441144 A1 5/1996
(Continued)

OTHER PUBLICATIONS

PCT International Searching Authority/US, International Search Report and Written Opinion of the International Searching Authority, dated Jun. 25, 2021, for PCT/US/2021/16851, "Treatment Composition and Method for Reducing Viscosity of Hydrocarbons."

*Primary Examiner* — Aiqun Li
(74) *Attorney, Agent, or Firm* — Jones Walker LLP (57) ABSTRACT

A treatment composition for reducing viscosity, pour point, and precipitate content of a hydrocarbon fluid at temperatures below 90° F., preferably 34° F. to 90° F. The treatment composition includes one or more mixed fatty acid methyl esters, an aromatic mixture consisting essentially of $C_9$ to $C_{15}$ aromatic compounds, and a main solvent consisting essentially of low odor kerosene, low odor diesel, or a mixture of low odor diesel or low odor kerosene. The treatment composition solubilizes hydrocarbon deposits for removal. The treatment composition also solubilizes paraffins and asphaltenes in a hydrocarbon fluid to prevent or mitigate the formation of hydrocarbon deposits.

23 Claims, 3 Drawing Sheets

(56) References Cited

U.S. PATENT DOCUMENTS

| | | |
|---|---|---|
| 9,617,505 B2 | 4/2017 | Ogawa |
| 2005/0197267 A1 | 9/2005 | Zaki |
| 2005/0256022 A1 | 11/2005 | Choo |
| 2006/0142172 A1 | 6/2006 | Cioletti |
| 2010/0022417 A1 | 1/2010 | Acunto |
| 2010/0314117 A1* | 12/2010 | Li .................. C09K 8/524 |
| | | 166/307 |
| 2015/0075561 A1 | 3/2015 | Dorton et al. |
| 2016/0075631 A1 | 3/2016 | Dantale et al. |

FOREIGN PATENT DOCUMENTS

| | | |
|---|---|---|
| EP | 0052786 A1 | 6/1982 |
| MX | PA05004193 A | 8/2006 |
| SU | 977715 A1 | 11/1982 |

* cited by examiner

TREATMENT COMPOSITION AND METHOD FOR REDUCING VISCOSITY OF HYDROCARBONS

BACKGROUND

In the petroleum industry, hydrocarbons sometimes form solid deposits in flow lines. These deposits are typically formed by hydrocarbons having higher pour points and including paraffins and asphaltenes. The hydrocarbon deposits can restrict or completely block the flow of liquid through the flow line.

Common solvents, such as xylene and diesel, are used to treat paraffin and/or asphaltenes deposits at higher temperatures. Xylene is believed to be effective at dissolving some asphaltenes deposits at 80° F.-90° F. However, in that temperature range xylene does not dissolve the paraffin portion of the deposit. Diesel is believed to be effective at treating some paraffin deposits at 150° F. However, diesel does not solubilize the paraffins; instead, diesel simply melts the paraffins at the higher treatment temperature. When either xylene or diesel solutions cool after treatment, the solutions form undesirable gels due to suspended paraffins.

Conventional treatment methods for removing hydrocarbon deposits from flow lines include use of solvents at high temperatures, i.e., hot oil treatments. A heated solvent is introduced into the flow line to break up and remove the hydrocarbon deposit. For example, diesel may be introduced into a flow line at a temperature of 150° F.

While these solvents are heated before use, they lose heat rapidly when pumped into a pipe. If a hydrocarbon deposit is positioned in a pipe positioned on a seafloor, the temperature in the pipe surrounding the hydrocarbon deposit is typically about 34° F. Similarly, if a hydrocarbon deposit is positioned in a flow line on land, the temperature in the pipe surrounding the hydrocarbon deposit is usually in the range of 34° F. to 90° F., for example. Accordingly, when the solvent reaches the hydrocarbon deposit, the solvent's temperature has been reduced such that the solvent is ineffective. For this reason, these solvent treatments are frequently ineffective at removing hydrocarbon deposits from flow lines.

Other prior art treatment compositions for hydrocarbon deposits include surfactants, which are used to suspend paraffins of the deposit. For example, U.S. Patent Application Publication No. 2006/0142172 A1 to Cioletti et al. ("Cioletti publication") discloses a composition for removal and remediation of hydrocarbon deposits. The composition is exemplified in example 1 of the Cioletti publication. This formulation has been shown not to solubilize hydrocarbon deposits at lower temperatures. Additionally, this formulation includes hydrophilic components. In hydrocarbon environments including produced water, the hydrophilic components are ineffective because they are drawn away from the hydrocarbon deposit and into the water phase.

There is a need for a solvent that effectively removes and prevents hydrocarbon deposits at lower temperatures.

DETAILED DESCRIPTION OF SELECTED EMBODIMENTS

A treatment composition is disclosed for removing, preventing, or mitigating a hydrocarbon deposit in a flow line by reducing the hydrocarbon's viscosity, pour point, and precipitate content. The present treatment composition has surprising and unexpected properties when used at lower temperatures, such as 34° F. to 90° F. It is contemplated that the present treatment composition may be used to reduce a viscosity of a hydrocarbon, to reduce a pour point of a hydrocarbon, and to reduce a precipitate content of a hydrocarbon.

The treatment composition comprises one or more mixed fatty acid methyl esters; an aromatic mixture; and a main solvent. The aromatic mixture consists essentially of $C_9$ to $C_{15}$ aromatic compounds. The main solvent consists essentially of low odor kerosene, low odor diesel, or a mixture of both low odor diesel and low odor kerosene.

The treatment composition may include about 10% to about 25% by weight, or any subrange therein, of the mixed fatty acid methyl esters. The amount of the mixed fatty acid methyl esters may be about 12% by weight to about 23% by weight, or any subrange therein, more preferably, about 15% by weight to about 20% by weight, or any subrange therein, and most preferably, about 17% by weight to about 19% by weight, or any subrange therein. In one embodiment, the amount of the mixed fatty acid methyl esters is about 18% by weight. In another embodiment, the amount of the mixed fatty acid methyl esters is about 12% by weight.

Fatty acid methyl esters are vegetable oil derivatives. Fatty acid methyl esters are environmentally friendly due to their biodegradability, low VOC production, and non-toxicity to humans. Fatty acid methyl esters have lower volatility and higher flash points than petroleum-based solvents. Fatty acid methyl esters reduce fire and explosion risks.

The one or more mixed fatty acid methyl esters may include a methyl ester derived from soy bean oil, palm kernel oil, cottonseed oil, sunflower oil, coconut oil, rapeseed oil, palm olein, palm kernel olein, palm stearin, palm kernel stearin, or any other fatty acid methyl ester. Fatty acid methyl esters derived from soy bean oil include methyl soyate, such as materials classified under CAS #67784-80-9. Commercially available soy bean methyl esters include Soy Solv I provided by Soy Solv Biosolvents or Soy Gold provided by AGP Cooperative. Fatty acid methyl esters derived from palm kernel oil include palm kernel methyl ester. Commercially available palm kernel methyl esters include Elevance HFS-10. The mixed fatty acid methyl esters may also include biofuel, biodiesel, or any $C_{14}$ to $C_{24}$ methyl esters.

The treatment composition may include about 2% to about 15% by weight of the aromatic mixture, or any subrange therein. Preferably, the amount of the aromatic mixture may be about 3% by weight to about 12% by weight, or any subrange therein, preferably, about 4% by weight to about 10% by weight, or any subrange therein, more preferably, about 4% by weight to about 8% by weight, or any subrange therein, and most preferably, about 5% by weight to about 7% by weight. In one embodiment, the amount of the aromatic mixture is about 5% by weight. In another embodiment, the amount of the aromatic mixture is about 8% by weight.

The aromatic mixture consists essentially of $C_9$ to $C_{15}$ aromatic compounds. The aromatic mixture may include heavy aromatic naphtha, high-flash point aromatic naphtha, solvent oil, $C_9$ aromatic mixtures, $C_{10}$ aromatic mixtures; $C_{10}$ to $C_{11}$ aromatic hydrocarbons; and $C_{12}$ to $C_{15}$ alkane/cycloalkane/aromatic hydrocarbons. Commercially available aromatic mixtures consisting essentially of $C_9$ to $C_{15}$ aromatic compounds include Flowsolve 212 provided by Croda International, Aromatic 150, Aromatic 200, and High Solve 150 provided by ExxonMobil and Chevron Phillips Chemical Co. These aromatic mixtures may be classified under CAS #64742-94-5.

In some embodiments of the present treatment composition, the total amount of the mixed fatty acid methyl ester and the aromatic mixture is about 20% to about 30% by weight.

The main solvent may form the balance of the composition. In some embodiments, the treatment composition includes up to about 88% main solvent. In other embodiments, the treatment composition includes at least about 60% main solvent. The main solvent may be a non-hazardous solvent with a high flash point. Additionally, the main solvent may be an economical material having a lower price than other commercially available solvents with similar functions.

The main solvent consists essentially of low odor kerosene, low odor diesel, or a mixture thereof. Low odor kerosene means any material classified under CAS #64742-47-8, which is a light petroleum distillate consisting of $C_9$ to $C_{16}$ hydrocarbons with boiling points in the range of 302° F. to 554° F. Commercially available low odor kerosene includes LPA-170, LPA-200, and LPA provided by Sasol Chemicals USA, LLC. Low odor diesel means any material classified under CAS #68476-34-6, which is a hydro-desulfurized middle distillate including $C_9$ to $C_{20}$ hydrocarbons with boiling points in the range of 325° F. to 675° F. The low odor diesel may include trace amounts of trimethyl benzene, naphthalene, biphenyl, isopropylbenzene, xylene, and ethylbenzene.

Embodiments of the present treatment composition are illustrated in the following non-limiting examples.

Example 1

| Ingredient | Wt. % |
| --- | --- |
| Soy Solve 1 (Soy bean methyl ester) | 10% |
| Flowsolve 212 | 2% |
| LPA-170 (Low odor kerosene) | 88% |

Example 2

| Ingredient | Wt. % |
| --- | --- |
| Soy Solve 1 (Soy bean methyl ester) | 25% |
| Flowsolve 212 | 10% |
| LPA-170 (Low odor kerosene) | 65% |

Example 3

| Ingredient | Wt. % |
| --- | --- |
| Soy Solve 1 (Soy bean methyl ester) | 10% |
| Flowsolve 212 | 15% |
| LPA-170 (Low odor kerosene) | 75% |

Example 4

| Ingredient | Wt. % |
| --- | --- |
| Soy Solve 1 (Soy bean methyl ester) | 25% |
| Flowsolve 212 | 2% |
| LPA-170 (Low odor kerosene) | 73% |

Example 5

| Ingredient | Wt. % |
| --- | --- |
| Soy Solve 1 (Soy bean methyl ester) | 18% |
| Flowsolve 212 | 5% |
| LPA-170 (Low odor kerosene) | 77% |

Example 6

| Ingredient | Wt. % |
| --- | --- |
| Elevance HFS-10 (Palm kernel methyl ester) | 18% |
| Flowsolve 212 | 5% |
| LPA-210 (Low odor kerosene) | 77% |

Example 7

| Ingredient | Wt. % |
| --- | --- |
| Soy Solve 1 (Soy bean methyl ester) | 18% |
| High Solve 150 | 5% |
| LPA-210 (Low odor kerosene) | 77% |

Example 8

| Ingredient | Wt. % |
| --- | --- |
| Soy Solve 1 (Soy bean methyl ester) | 18% |
| Flowsolve 212 | 5% |
| Low odor diesel | 77% |

Example 9

| Ingredient | Wt. % |
| --- | --- |
| Soy Gold 1000 (Soy bean methyl ester) | 18% |
| Flowsolve 212 | 5% |
| LPA-170 (Low odor kerosene) | 77% |

The fatty acid methyl ester, the aromatic mixture, and the main solvent in the present treatment composition are all solvents. Each solvent is typically used at elevated temperatures. Each solvent is individually ineffective at solubilizing paraffins at lower temperatures, such as 34° F. to 90° F.

The combination of the fatty acid methyl ester, the aromatic mixture, and the main solvent provides a synergistic benefit. The present treatment composition has surprising and unexpected properties. Specifically, the present treatment composition provides unexpected superior results in the solubilization of paraffins and asphaltenes, viscosity reduction, pour point reduction, and precipitate content reduction in viscous hydrocarbon samples at lower temperatures.

The present treatment composition breaks down hard paraffin deposits and solubilizes the paraffins to flow with the hydrocarbon fluid. The aromatic mixture in the present treatment composition is believed to act as a carrier or a suspending agent to prevent paraffins from re-depositing even below the pour point of the paraffins. The treatment composition also dissolves asphaltenes. The present treatment composition is effective at removing hydrocarbon deposits from flow lines and pipelines at lower temperatures, such as 32° F. or less. The present treatment composition is also effective at preventing hydrocarbon deposits from forming in flow lines and pipelines at lower temperatures, such as 32° F. or less.

Experiments illustrated the synergistic effect of the fatty acid methyl ester, the aromatic mixture, and the main solvent in the present treatment composition.

A first experiment measured the viscosity reduction achieved by conventional solvent treatments and by embodiments of the present treatment composition. Samples of the treatment composition in Examples 1-8 were prepared. Conventional treatment samples C1, C2, and C3 were also prepared as follows:

Sample C1:

| Ingredient | Wt. % |
| --- | --- |
| LPA-170 (Low odor kerosene) | 100% |

Sample C2:

| Ingredient | Wt. % |
| --- | --- |
| Low odor diesel | 100% |

Sample C3:

| Ingredient | Wt. % |
| --- | --- |
| Aromatic 150 | 50% |
| LPA-210 (Low odor kerosene) | 50% |

A viscous crude hydrocarbon sample used in these experiments had an API gravity of 15-18 and a pour point of about 34° F. to 40° F. Experiments showed the viscous crude hydrocarbon sample to have a viscosity of 21,600 cp to 23,840 cp at 60° F. using a Brookfield viscometer. In subsea flow lines subjected to temperatures of 34° F., deposits are expected to form in this viscous crude hydrocarbon sample. The physical properties of this hydrocarbon sample are common for hydrocarbons forming deposits in industrial settings.

A portion of the viscous hydrocarbon sample was placed in 11 beakers. The viscosity of the viscous hydrocarbon sample alone (i.e., pre-treatment) was tested using a Brookfield viscometer. The viscosity of 1 beaker of the viscous hydrocarbon sample was tested at 35° F. The viscosity of the other 10 beakers of the viscous hydrocarbon sample were tested at 60° F.

Each of the conventional treatment samples C1, C2, and C3 were then added to the viscous hydrocarbon sample in 3 beakers. Each of the present treatment compositions, Examples 1-8 were added to the viscous hydrocarbon sample in the other 8 beakers, respectively. Example 5 was added to the hydrocarbon sample whose viscosity was tested at 34° F. Initially, the amount of each treatment sample added equated to a concentration of 1 fluid ounce of the treatment sample in 1 barrel of the viscous hydrocarbon sample (i.e., 1 oz/barrel) to provide a treated hydrocarbon sample. The treated hydrocarbon samples were stirred and allowed to settle for entrained air to escape. The viscosity of the treated hydrocarbon sample in each beaker were measured using a Brookfield viscometer. The viscosity measurement of the treated hydrocarbon sample containing Example 5 was taken at 34° F., and all other viscosity measurements were taken at 60° F.

Next, an additional amount of each treatment sample was added to achieve a concentration corresponding to 2 fluid ounces of the treatment sample in 1 barrel of the viscous hydrocarbon sample (i.e., 2 oz/barrel). The treated hydrocarbon samples were again stirred and allowed to settle for the escape of entrained air. The viscosity of the treated hydrocarbon sample in each beaker was again measured using a Brookfield viscometer. The viscosity measurement of the treated hydrocarbon sample containing Example 5 was taken at 34° F., and all other viscosity measurements were taken at 60° F.

Finally, an additional amount of the present treatment samples was added to achieve a concentration corresponding to 4 fluid ounces of the treatment sample in 1 barrel of the viscous hydrocarbon sample (i.e., 4 oz/barrel). The treated hydrocarbon samples were again stirred and allowed to settle for the escape of entrained air. The viscosity of the treated hydrocarbon sample in each beaker were again measured using a Brookfield viscometer. The viscosity measurement of the treated hydrocarbon sample containing Example 5 was taken at 34° F., and all other viscosity measurements were taken at 60° F. No viscosity measurements were taken for the conventional treatment compositions in Samples C1, C2, and C3 at the 4 oz/barrel concentration.

The viscosity measurements are shown in Table 1 below.

TABLE 1

| Treatment Sample | Viscosity test temp. | Viscosity, pretreatment | Viscosity, 1 oz/barrel treatment | Viscosity, 2 oz/barrel treatment | Viscosity, 4 oz/barrel treatment |
| --- | --- | --- | --- | --- | --- |
| C1 | 60° F. | 22,600 | 22,600 | 22,600 | |
| C2 | 60° F. | 22,600 | 22,600 | 22,600 | |
| C3 | 60° F. | 22,600 | 22,680 | 22,680 | |

TABLE 1-continued

| Treatment Sample | Viscosity test temp. | Viscosity, pretreatment | Viscosity, 1 oz/barrel treatment | Viscosity, 2 oz/barrel treatment | Viscosity, 4 oz/barrel treatment |
| --- | --- | --- | --- | --- | --- |
| Example 1 | 60° F. | 22,200 | 22,200 | 21,750 | 21,080 |
| Example 2 | 60° F. | 22,200 | 22,150 | 22,040 | 21,700 |
| Example 3 | 60° F. | 21,660 | 20,500 | 19,050 | 18,180 |
| Example 4 | 60° F. | 23,280 | 22,280 | 21,540 | 20,460 |
| Example 5 | 34° F. | 55,600 | 47,810 | 39,560 | 37,520 |
| Example 6 | 60° F. | 24,610 | 23,900 | 22,410 | 22,140 |
| Example 7 | 60° F. | 23,300 | 23,300 | 22,640 | 22,480 |
| Example 8 | 60° F. | 23,840 | 23,100 | 22,430 | 20,900 |

Figure 1:
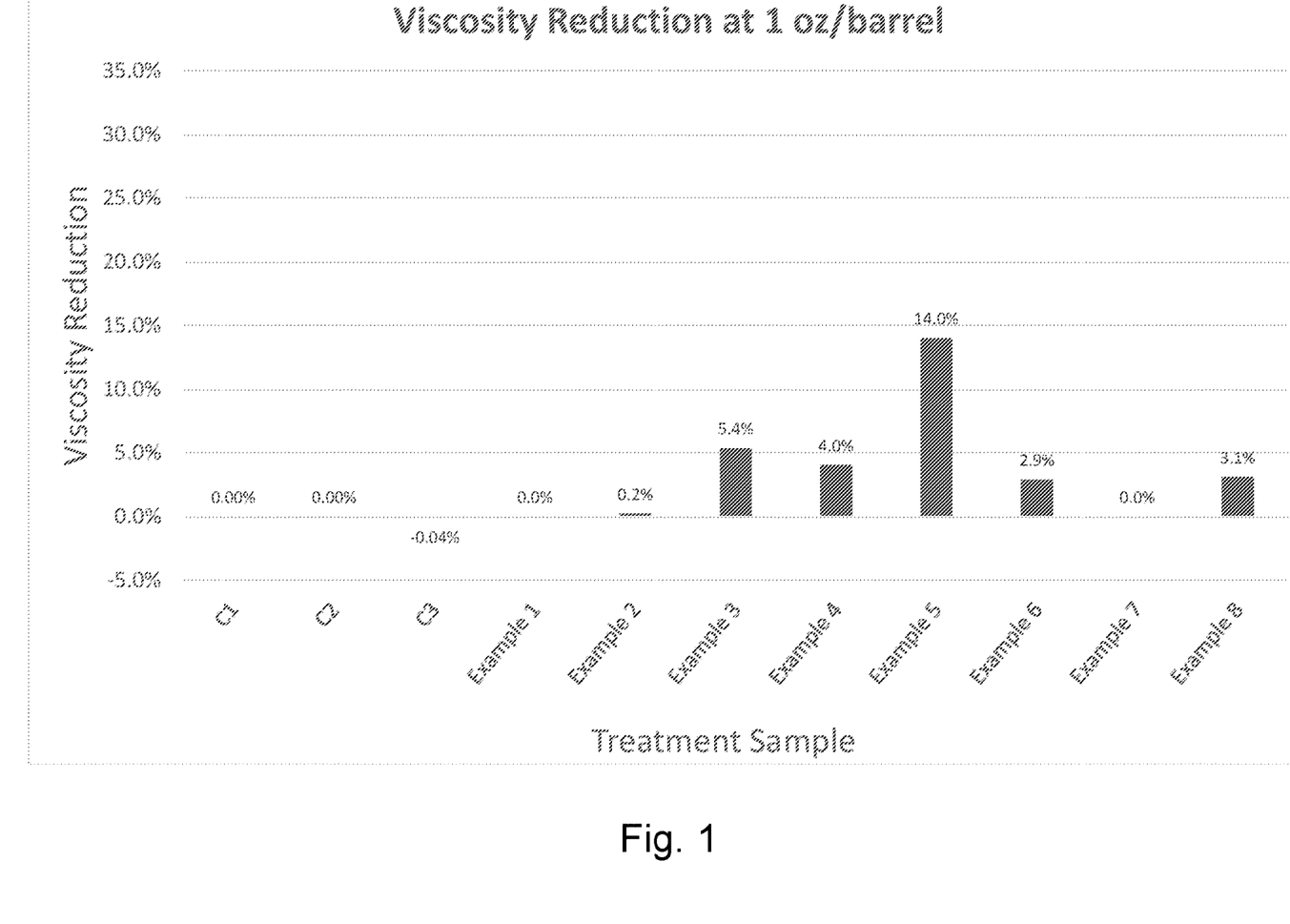
FIG. 1 is a graph showing the viscosity reduction of a crude hydrocarbon sample after mixing with 1 oz/barrel of conventional treatments and samples of the present treatment composition.
Figure 2:
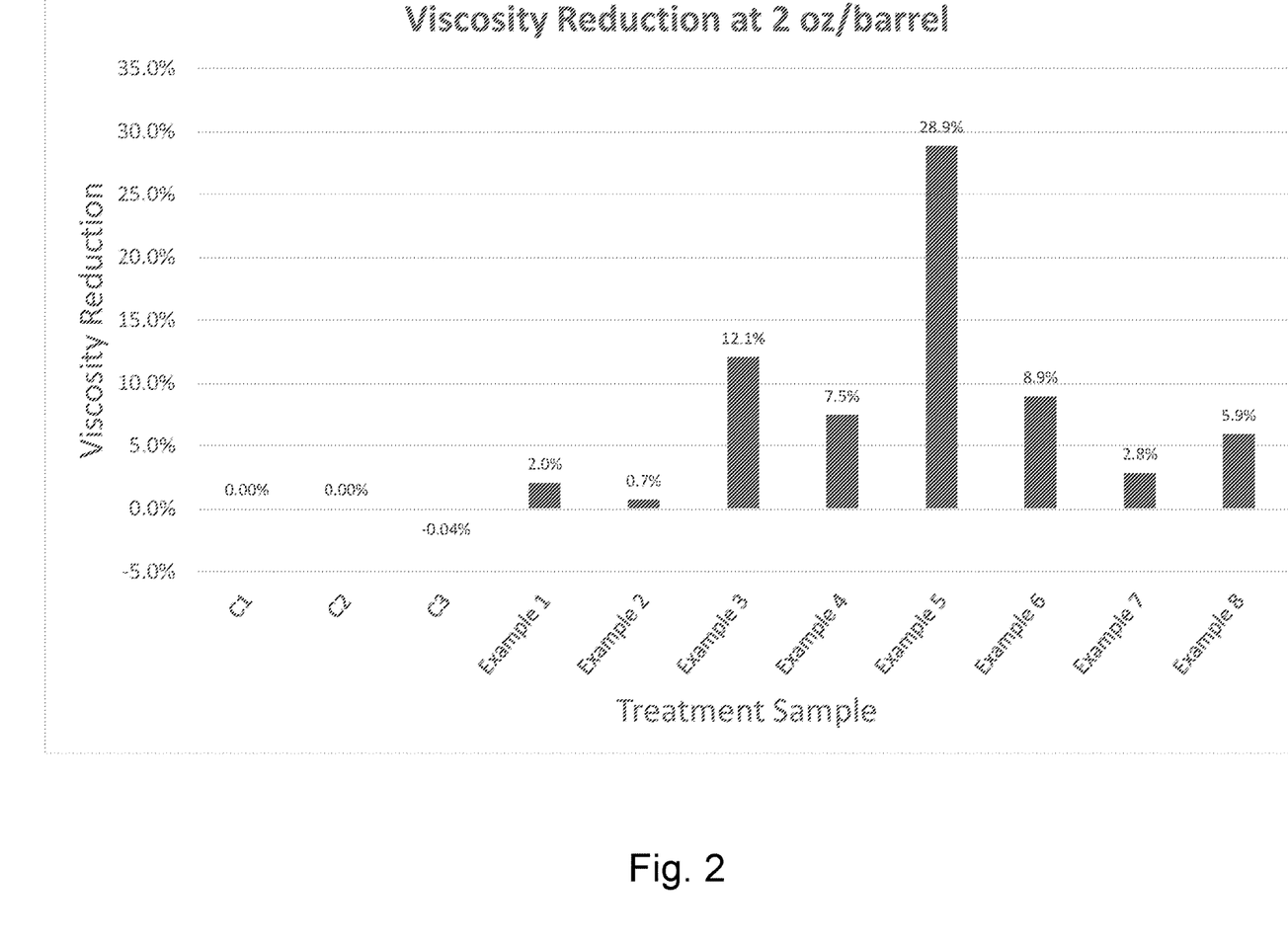
FIG. 2 is a graph showing the viscosity reduction of a crude hydrocarbon sample after mixing with 2 oz/barrel of conventional treatments and samples of the present treatment composition.
Figure 3:
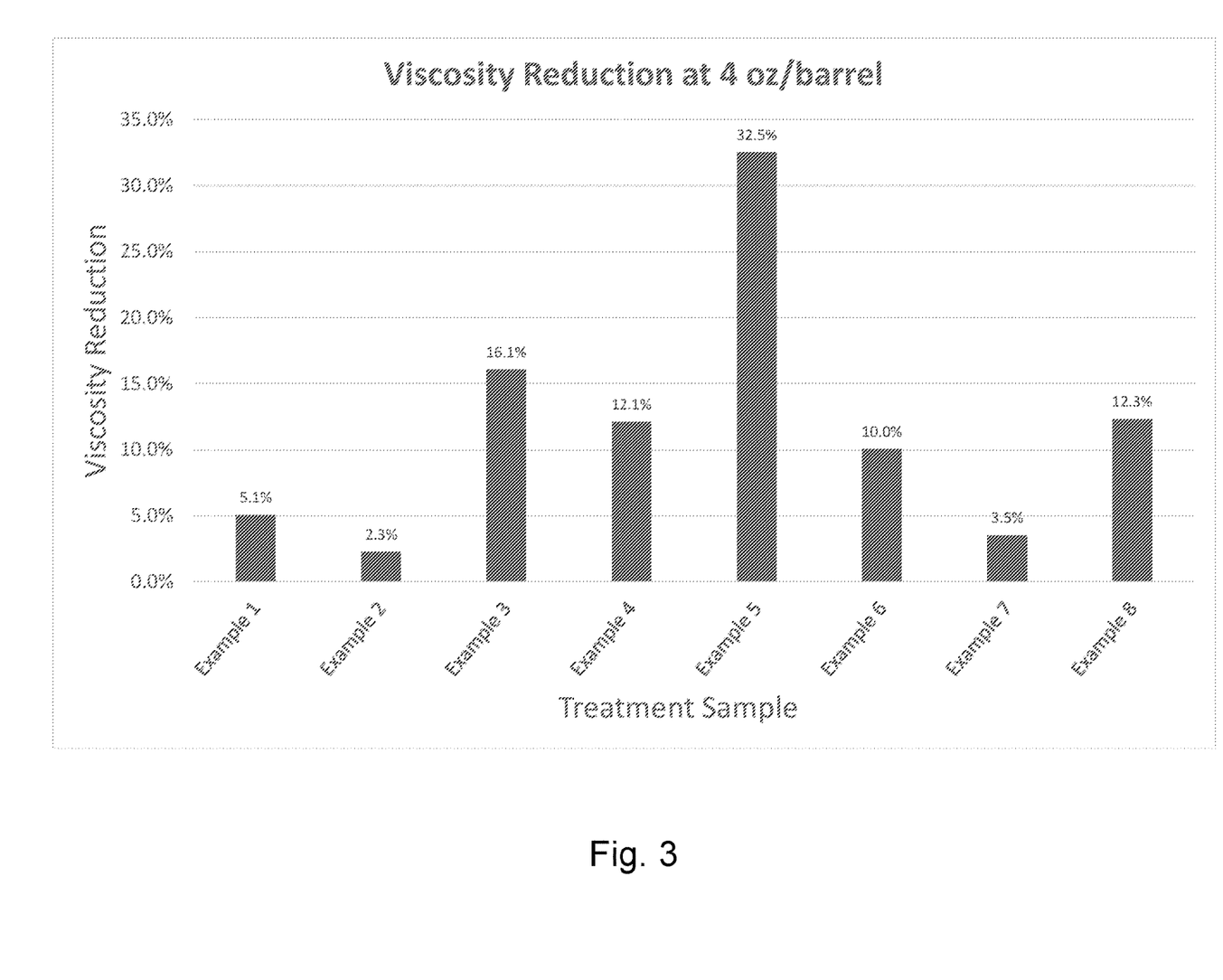
FIG. 3 is a graph showing the viscosity reduction of a crude hydrocarbon sample after mixing with 4 oz/barrel of samples of the present treatment composition.

A viscosity reduction value was calculated for each treatment sample. The viscosity reduction values were calculated using the following formula:

$$\text{Viscosity Reduction} = \left(\frac{\mu_{initial} - \mu_{treated}}{\mu_{initial}}\right) * 100\%$$

where $\mu_{initial}$ is the initial viscosity of the viscous crude hydrocarbon sample initially placed in the beakers and $\mu_{treated}$ is the viscosity of the treated hydrocarbon sample in the beaker after the treatment sample was added.

FIG. 1 illustrates the viscosity reduction for the viscous hydrocarbon samples treated with each of the treatments at a concentration of 1 oz/barrel. Samples C1, C2, and C3 did not reduce the viscosity of the hydrocarbon sample, but several of the present treatment compositions achieved viscosity reduction. The viscosity measurement of the hydrocarbon sample treated with Sample C3 at 1 oz/barrel concentration indicated an increase in viscosity, which was believed to be caused by air entrainment. At this low treatment concentration, the viscosity reduction provided by Examples 3, 4, 6, and 8 were between 2.9% and 5.4%. Example 2 reduced the viscosity of the hydrocarbon sample by only 0.2%. Examples 1 and 7 did not reduce the viscosity of the viscous hydrocarbon sample at a treatment concentration of 1 oz/barrel. However, treating the hydrocarbon sample with 1 oz/barrel of Example 5 reduced the viscosity of the hydrocarbon sample by 14%. The viscosity measurements for Example 5 were taken at 34° F., but the same or better viscosity reduction percentage is expected at 60° F.

FIG. 2 illustrates the viscosity reduction for the viscous hydrocarbon samples treated with each of the treatments at a concentration of 2 oz/barrel. Samples C1, C2, and C3 did not reduce the viscosity of the hydrocarbon sample, but all of the present treatment compositions achieved viscosity reduction. At this treatment concentration, the viscosity reduction provided by Examples 3, 4, 6, and 8 were between 5.9% and 12.1%. Example 2 reduced the viscosity of the hydrocarbon sample by only 0.7%. Examples 1 and 7 reduced the viscosity of the viscous hydrocarbon sample by 2.0% and 2.8%, respectively. However, treating the hydrocarbon sample with 2 oz/barrel of Example 5 reduced the viscosity of the hydrocarbon sample by 28.9%. Again, the viscosity measurements for Example 5 were taken at 34° F., but the same or better viscosity reduction percentage is expected at 60° F. with a concentration of 2 oz/barrel.

FIG. 3 illustrates the viscosity reduction for the viscous hydrocarbon samples treated with each of the treatments at a concentration of 4 oz/barrel. All of the present treatment compositions achieved viscosity reduction. At this treatment concentration, the viscosity reduction provided by Examples 3, 4, 6, and 8 were between 10.0% and 16.1%. Examples 1, 2, and 7 reduced the viscosity of the hydrocarbon sample by 2.3% to 5.1%. However, treating the hydrocarbon sample with 4 oz/barrel of Example 5 reduced the viscosity of the hydrocarbon sample by 32.5%. Again, the viscosity measurements for Example 5 were taken at 34° F., but the same or better viscosity reduction percentage is expected at 60° F. with a concentration of 4 oz/barrel.

It was surprising that the present treatment composition reduces the viscosity of a viscous hydrocarbon sample at temperatures of 34° F. and 60° F. because the embodiments of the present treatment composition used in the experiment include only three solvent ingredients, without any surfactant.

There is a direct correlation between viscosity and pour point. The reduction in viscosity of the crude hydrocarbon sample achieved by the present treatment composition correlates to a decrease in the pour point of the crude hydrocarbon sample. Reducing viscosity and the pour point of a crude hydrocarbon in a flow line increases the velocity of the hydrocarbon, which allows the hydrocarbon to flow without increasing pressure in the flow line. Increased pressure in flow lines causes non-laminar flow, which results in a greater chance of hydrocarbon deposits forming in the flow lines. As compared to conventional solvent treatments, the present treatment composition achieves a superior viscosity reduction and pour point reduction when used to treat hydrocarbon samples at lower temperatures of 34° F. and 60° F. In this way, the treatment composition prevents or mitigates the formation of hydrocarbon deposits in flow lines even at lower temperatures associated with subsea flow lines.

A second experiment measured the pour point reduction achieved by the present treatment composition. The same viscous hydrocarbon sample used in the viscosity reduction experiment was used for this pour point reduction experiment. The hydrocarbon sample was placed in a beaker, then cooled using an ice bath. The temperature of the hydrocarbon sample was measured continuously while stirring occasionally. The pour point of the untreated hydrocarbon sample was recorded. Samples of Examples 4 and 5 were added into the hydrocarbon sample, first at a concentration of 1 oz/barrel, then at a concentration of 2 oz/barrel as described above. The temperature at which the untreated or treated hydrocarbon sample held the thermometer in an upright position was recorded as the pour point. The pour point measurements are shown in Table 2 below.

TABLE 2

| | Treatment Concentration | Pour Point | Pour Point Reduction |
| --- | --- | --- | --- |
| Untreated | (blank) | 38-40° F. | 0° F. |
| Example 4 | 1 oz/barrel | 36° F. | 2-4° F. |
| Example 4 | 2 oz/barrel | 32° F. | 6-8° F. |
| Example 5 | 1 oz/barrel | 34° F. | 4-6° F. |
| Example 5 | 2 oz/barrel | 28° F. | 10-12° F. |

The results of the pour point reduction experiment illustrate the pour point reduction corresponding to the viscosity reduction achieved by the embodiments of the present treatment composition.

A third experiment measured the precipitate reduction achieved by conventional solvent treatments and by embodiments of the present treatment composition. These experiments used two crude hydrocarbon samples having similar physical properties. The first crude hydrocarbon sample had an API gravity of 34. Experiments showed the first crude hydrocarbon sample had a viscosity of 18.3 cp at 60° F. using a Brookfield viscometer. The second crude hydrocarbon sample had an API gravity of 35. Experiments showed the second crude hydrocarbon sample had a viscosity of 10 cp at 60° F. using a Brookfield viscometer. The physical properties of the first and second crude hydrocarbon samples are common for hydrocarbons forming deposits in industrial settings.

A portion of the first crude hydrocarbon sample was placed in 7 containers, and a portion of the second crude hydrocarbon sample was placed in 3 containers. Each of the conventional treatment samples C1, C2, and C3 and the embodiment of the present treatment composition in Example 9 were added to the beakers as shown in Table 3 below. The contents of each container were shaken to mix the treatment sample with the hydrocarbon samples.

TABLE 3

| Container | Hydrocarbon Sample | Treatment | Treatment concentration |
|---|---|---|---|
| 1 | First crude hydrocarbon sample | Blank - no treatment | |
| 2 | First crude hydrocarbon sample | C1 | 1 oz/barrel |
| 3 | First crude hydrocarbon sample | C1 | 2 oz/barrel |
| 4 | First crude hydrocarbon sample | C2 | 1 oz/barrel |
| 5 | First crude hydrocarbon sample | C2 | 2 oz/barrel |
| 6 | First crude hydrocarbon sample | C3 | 1 oz/barrel |
| 7 | First crude hydrocarbon sample | C3 | 2 oz/barrel |
| 8 | Second crude hydrocarbon sample | Blank - no treatment | |
| 9 | Second crude hydrocarbon sample | Example 9 | 1 oz/barrel |
| 10 | Second crude hydrocarbon sample | Example 9 | 2 oz/barrel |

Each container was stored for a treatment time of 24 hours at 34° F. After the treatment time, the contents of each container were poured over a wire mesh screen. Each hydrocarbon sample moved through the wire mesh screen leaving a residue on the screen. This residue is the precipitate portion of the hydrocarbon sample. The wire mesh screen with the remaining precipitate residue was weighed after 5 minutes (subtracting the weight of that wire mesh screen and the container in which it was weighed). The temperature of the contents of each container when poured over the wire mesh screen was 34° F.

A precipitate reduction value was calculated for each container. The precipitate reduction value is the percent of the solid hydrocarbon solubilized by treatment. The precipitate reduction values were calculated using the following formula:

$$\text{Precipitate Reduction} = \left(\frac{wt_{blank} - wt_{treated}}{wt_{blank}}\right) * 100\%$$

where $wt_{blank}$ is the weight of precipitate from the blank sample remaining on the wire mesh screen and $wt_{treated}$ is the weight of precipitate from each treated sample remaining on the wire mesh screen.

The weight measurements and precipitate reduction values are shown in Table 4 below.

TABLE 4

| Treatment | Treatment concentration | Weight of Precipitate | Precipitate Reduction |
|---|---|---|---|
| Blank | No treatment | 0.50 g | |
| C1 | 1 oz/barrel | 0.50 g | 0% |
| C1 | 2 oz/barrel | 0.50 g | 0% |
| C2 | 1 oz/barrel | 0.50 g | 0% |
| C2 | 2 oz/barrel | 0.49 g | 2% |
| C3 | 1 oz/barrel | 0.50 g | 0% |
| C3 | 2 oz/barrel | 0.50 g | 0% |
| Blank | No treatment | 0.30 g | |
| Example 9 | 1 oz/barrel | 0.26 g | 13% |
| Example 9 | 2 oz/barrel | 0.18 g | 40% |

Samples C1 and C3 had no precipitate reducing effect in the first crude hydrocarbon sample at concentrations of 1 oz/barrel and at 2 oz/barrel. Sample C2 had no precipitate reducing effect in the first crude hydrocarbon sample at the concentration of 1 oz/barrel, and only a 2% precipitate reduction at the concentration of 2 oz/barrel. Due to the similarity in the physical properties of the two crude hydrocarbon samples, conventional solvent treatments C1, C2, and C3 are each expected to provide the same or very similar precipitate reductions in the second crude hydrocarbon sample.

Surprisingly, Example 9 achieved a 13% and 40% precipitate reduction in the second crude hydrocarbon sample at concentrations of 1 oz/barrel and 2 oz/barrel, respectively. Due to the similarity in the physical properties of the two crude hydrocarbon samples, Example 9 is expected to provide the same or very similar precipitate reduction in the first crude hydrocarbon sample.

Samples C1, C2, and C3 are conventional solvent treatments used in the oil industry. The precipitate reduction experiment showed that these conventional solvent treatments are ineffective at solubilizing paraffins and asphaltenes in crude hydrocarbon samples at 34° F. The present treatment composition, including the embodiment in Example 9, contains only three solvent ingredients without any surfactants. However, the specific combination of solvents in the present treatment composition achieves a synergy that provides unexpected superior precipitate reduction in hydrocarbon samples. These experiments showed that the present treatment composition solubilizes paraffins and asphaltenes when used to treat a hydrocarbon sample at 34° F.

Surprisingly, these unexpected superior results are achieved by embodiments of the present treatment composition that include only three solvents without any surfactant or wetting agent.

In embodiments such as Examples 1-9, the treatment composition includes a mixed fatty acid methyl ester, an aromatic mixture, and a main solvent consisting essentially of low odor kerosene, low odor diesel, or a mixture of low odor kerosene and low odor diesel. These embodiments include only hydrophobic components, which remain in the oil phase even in hydrocarbon systems including produced water.

While the treatment composition does not require any additives to effectively reduce the viscosity, pour point, and precipitate content of a hydrocarbon at lower temperatures, some embodiments of the treatment composition may further include one or more additives. The additives may include corrosion inhibitors, paraffin dispersants, surfactants, or de-emulsifiers. Corrosion inhibitors such as ethoxylated tallow or ethoxylated coconut oil may be used. Surfactants such as phosphate esters may further enhance the performance of the present treatment composition, but is undesirable to include phosphate esters in certain treatment conditions. For example, using an embodiment of the present treatment composition that includes a phosphate ester to treat hydrocarbons in sales lines may have detrimental effects when the hydrocarbons reach refineries.

In some embodiments, the treatment composition may further include about 1% by weight to about 5% by weight of one or more additives, or any subrange therein. In another embodiment, the treatment composition may further include about 2% by weight to about 8% by weight of one or more additives, or any subrange therein. In yet another embodiment, the treatment composition may further include about 5% by weight to about 15% by weight of one or more additives, or any subrange therein. In some embodiments, the treatment composition may comprise up to about 15% by weight of all additives, preferably, up to about 7% by weight of all additives, more preferably, up to about 5% by weight of all additives. In these embodiments, the treatment composition includes at least about 45% main solvent.

Additional embodiments of the present treatment composition are illustrated in following non-limiting examples.

Example 10

| Ingredient | Wt. % |
| --- | --- |
| Soy Solve 1 (Soy bean methyl ester) | 18% |
| Flowsolve 212 | 5% |
| LPA-170 (Low odor kerosene) | 72% |
| Witbreak DRC-271 (de-emulsifier) | 5% |

Example 11

| Ingredient | Wt. % |
| --- | --- |
| Soy Solve 1 (Soy bean methyl ester) | 15% |
| Flowsolve 212 | 5% |
| LPA-170 (Low odor kerosene) | 73% |
| Ethomeen T/15 (corrosion inhibitor) | 7% |

Example 12

| Ingredient | Wt. % |
| --- | --- |
| Soy Solve 1 (Soy bean methyl ester) | 15% |
| Flowsolve 212 | 5% |
| LPA-170 (Low odor kerosene) | 70% |
| NP-100 (surfactant) | 2% |
| Witbreak DGE-169 (de-emulsifier) | 8% |

Example 13

| Ingredient | Wt. % |
| --- | --- |
| Soy Solve 1 (Soy bean methyl ester) | 18% |
| Flowsolve 212 | 5% |
| LPA-170 (Low odor kerosene) | 73% |
| Rhodafac PL-6 (surfactant) | 2% |
| Tomadol 91-2.5 (de-emulsifier) | 2% |

The present treatment composition may be used to reduce the viscosity, to reduce the pour point, and to reduce the precipitate content of any viscous crude hydrocarbon at temperatures below 90° F., at temperatures below 70° F., at temperatures below 50° F., at temperatures below 50° F., and at temperatures of 34° F. and below. Non-limiting examples of temperature ranges for settings in which the present treatment composition may be used include temperatures in the range of 32° F. to 34° F. in deepwater subsea applications, temperatures in the range of 34° F. to 76° F. in shallow water subsea applications, temperatures in the range of 28° F. to 60° F. or 65° F. in colder climate land applications, and temperatures in the range of 40° F. to 90° F. in warmer climate land applications. The present treatment composition may also be used in each of these settings at other temperature ranges.

Many uses exist for this treatment composition. The following methods are non-limiting examples of applications in which the present treatment composition may be used at lower temperatures.

The present treatment composition may be injected into a hydrocarbon fluid to reduce a viscosity, a pour point, or a precipitate content of the hydrocarbon fluid at a temperature of 90° F. or below.

The treatment composition may be used to remove a hydrocarbon deposit from a flow line, a wellbore, a vessel, or another surface at a temperature in the range of 34° F. to 90° F. The flow line may be a pipeline, especially those pipelines existing in lower temperature environments. The treatment composition may solubilize the hydrocarbon deposit within a treatment time of about 1 minute to about 1 month, preferably, about 12 hours to about 1 week, more preferably, about 24 hours to about 48 hours.

In this method, the treatment composition may solubilize hydrocarbon deposits including paraffins, asphaltenes, or both paraffins and asphaltenes. The treatment composition solubilizes the hydrocarbon deposit by making a substantial portion of the paraffins and asphaltenes from the hydrocarbon deposit soluble in a fluid surrounding the deposit or by suspending the paraffins and asphaltenes from the hydrocarbon deposit in the surrounding fluid. It is believed that the treatment composition dissolves asphaltenes, disperses $C_{16}$ to $C_{40}$ hydrocarbons, and suspends $C_{40}$ to $C_{60}$ hydrocarbons. The fluid may be the surrounding crude hydrocarbon. In one embodiment, the fluid is the treatment composition. The treatment composition may also reduce the viscosity, the pour point, and the precipitate content of a hydrocarbon fluid.

The treatment composition disclosed herein may be used at a concentration of at least about 1 fluid ounce of treatment composition per barrel of hydrocarbon to be treated (i.e., 1 oz/barrel). In most embodiments, the treatment composition may be used at a concentration of about 1 oz/barrel to about 4 oz/barrel. The treatment composition is effective at concentrations greater than 4 oz/barrel, but it is believed that use of the treatment composition at these higher concentrations would be uneconomical in most applications. In some embodiments, the treatment composition may be used at a concentration of about 2 oz/barrel to about 3 oz/barrel.

In other embodiments, a concentration of the present treatment composition used may be determined by a size of a hydrocarbon deposit. For example, the volume of the treatment composition used may be about 1% to about 2% of the volume of the hydrocarbon deposit.

In one embodiment, the present treatment composition may be used to remove a hydrocarbon deposit from a pipeline at a temperature of 34° F. to 90° F. The treatment composition may be injected using a chemical injection meter into a hydrocarbon flowing through the pipeline. The treatment composition may be injected into the pipeline at a location that is upstream from the hydrocarbon deposit. The treatment composition solubilizes the hydrocarbon deposit in the pipeline. The solubilized hydrocarbon deposit is carried out of the pipeline by hydrocarbon flowing therethrough.

In another embodiment, the present treatment composition may be used to remove a hydrocarbon deposit that has reduced the flow of a hydrocarbon in a section of a pipeline that is at 34° F. to 90° F. The treatment composition may be deployed to the hydrocarbon deposit location using a pig with the treatment composition contained between two place holders. A treatment time for removing the hydrocarbon deposit from the pipeline will depend on the size of the pipe and the size and composition of the hydrocarbon deposit. For example, but not by way of limitation, the treatment time may be about 24-48 hours.

In yet another embodiment, the present treatment composition may be used in the decommissioning sweep process for removing a pipeline or in the preservation process for abandoning a pipeline in place. In both processes, the treatment composition may be introduced into the pipeline, with or without other chemical products, to remove hydrocarbon deposits in preparation for removing or abandoning the pipeline. In these processes, the treatment composition is effective in the pipeline at a temperature of 34° F. to 90° F.

In another embodiment, the present treatment composition may be used to remove a hydrocarbon deposit from a wellbore. For example, the treatment composition may be introduced into the wellbore using chemical injection tubing to contact a hydrocarbon deposit in an annulus with the treatment composition. Over a treatment time, the treatment composition may solubilize the hydrocarbon deposit to remove the deposit from the wellbore.

In one embodiment, the present treatment composition may be used to remove a hydrocarbon deposit from a vessel. For example, a volume of the treatment composition may be used to solubilize hydrocarbon deposits remaining on a floor of a bulk storage vessel. In one embodiment, the volume of treatment composition added to the tank is about 1% to about 2% of the volume of the hydrocarbon deposit in the tank. In some embodiments, the volume of treatment composition needed in this application may be 100 gallons or more.

In other embodiments, the treatment composition may also be used to prevent or mitigate the formation of hydrocarbon deposits in a flow line, a wellbore, or a vessel at a temperature in the range of 34° F. to 90° F. In these embodiments, the treatment composition may be injected into the flow line or wellbore continuously for a limited time or indefinitely to prevent or mitigation the formation of hydrocarbon deposits by reducing the viscosity, the pour point, and the precipitate content of the hydrocarbon fluid to increase flow rates. In other embodiments, the treatment composition may be injected into a hydrocarbon fluid in a vessel to prevent or mitigate the formation of hydrocarbon deposits in the vessel. In further embodiments, the treatment composition may be used to treat a new flow line or a new vessel before the introduction of a hydrocarbon fluid in order to prevent or mitigate the formation of hydrocarbon deposits in the flow line or vessel. In each application, the treatment composition is effective at temperatures of 34° F. to 90° F.

The addition of the treatment composition to hydrocarbons reduces the viscosity, the pour point, and the precipitate content by solubilizing (i.e., dissolving and/or suspending) paraffins and asphaltenes. The treatment composition solubilizes asphaltenes in viscous hydrocarbons, thereby decreasing the viscosity and increasing the flow velocity of the hydrocarbon fluids. The treatment composition also reduces the attraction of the heavier hydrocarbons to one another. By improving the physical properties of hydrocarbon fluids, the use of the treatment composition may prevent the need for heater treaters, insulated pipes, and other equipment and steps that increase the cost of operations.

As used herein, "solubilize" means to make a substantial portion of a material soluble in a fluid or to suspend or disperse a material in a fluid for an indefinite period of time. As used herein, "flow line" means any pipe, conduit, or equipment configured to allow a fluid flow therethrough. Non-limiting examples of flow lines include pipes, pipelines, transmission lines, heater treaters, separators, and gun barrels. As used herein, "vessel" means any container configured to retain or hold a fluid. Non-limiting examples of vessels include tanks, tankers, and water vessel tankers.

Except as otherwise specified, percentages disclosed herein are weight percentages. Except as otherwise described, the composition and method described in this disclosure may include any combination of the described compounds, components, features, and/or functions of each of the individual embodiments. Each method described in this disclosure may include any combination of the described steps in any order, including the absence of certain described steps and combinations of steps used in separate embodiments. Any range of numeric values disclosed herein includes any subrange therein.

While preferred embodiments have been described, it is to be understood that the embodiments are illustrative only and that the scope of the invention is to be defined solely by the appended claims when accorded a full range of equivalents, many variations and modifications naturally occurring to those skilled in the art from a review hereof.

I claim:

1. A composition for reducing a viscosity, a pour point, or a precipitate content of a hydrocarbon at a temperature below 90° F., comprising:
    about 10% to about 25% by weight of one or more mixed fatty acid methyl esters;
    about 2% to about 15% by weight of an aromatic mixture consisting essentially of $C_9$ to $C_{15}$ aromatic compounds; and
    a main solvent consisting essentially of low odor kerosene, low odor diesel, or a mixture of low odor kerosene and low odor diesel.

2. The composition of claim 1, wherein the one or more mixed fatty acid methyl esters comprise soy methyl ester.

3. The composition of claim 1, wherein the one or more mixed fatty acid methyl esters comprise palm kernel methyl ester.

4. The composition of claim 1, wherein the main solvent consists essentially of a low odor kerosene.

5. The composition of claim 1, wherein the main solvent consists essentially of a low odor diesel.

6. The composition of claim 1, wherein the main solvent consists essentially of a mixture of low odor kerosene and low odor diesel.

7. The composition of claim 1, further comprising one or more additives.

8. The composition of claim 1, wherein the composition does not include a surfactant.

9. A method of reducing a viscosity, a pour point, or a precipitate content of a hydrocarbon fluid at a temperature below 90° F., comprising:

a) injecting a treatment composition into a hydrocarbon fluid, wherein the treatment composition comprises: about 10% to about 25% by weight of one or more mixed fatty acid methyl esters; about 2% to about 15% by weight of an aromatic mixture consisting essentially of $C_9$ to $C_{15}$ aromatic compounds; and a main solvent consisting essentially of low odor kerosene, low odor diesel, or a combination of low odor kerosene and low odor diesel.

10. The method of claim 9, wherein the treatment composition solubilizes paraffins and asphaltenes in the hydrocarbon fluid at a temperature of about 34° F. to about 90° F. to prevent or mitigate the formation of hydrocarbon deposits.

11. The method of claim 10, wherein the treatment composition is injected into the hydrocarbon fluid at a concentration of at least about 1 oz/barrel.

12. The method of claim 10, wherein the treatment composition is injected into the hydrocarbon fluid at a concentration of about 1 oz/barrel to about 4 oz/barrel.

13. The method of claim 11, wherein the hydrocarbon fluid is crude oil.

14. The method of claim 11, wherein the hydrocarbon fluid is contained in a flow line, a wellbore, or a vessel, and wherein the treatment composition is injected into the flow line, the wellbore, or the vessel.

15. The method of claim 14, wherein a temperature within the flow line, the wellbore, or the vessel surrounding the hydrocarbon deposit is about 34° F. to about 60° F.

16. The method of claim 14, wherein a temperature within the flow line, the wellbore, or the vessel surrounding the hydrocarbon deposit is about 60° F. to about 90° F.

17. A method of removing a hydrocarbon deposit from a flow line, a wellbore, a vessel, or a surface at a temperature in the range of 34° F. to 90° F., comprising:

a) contacting the hydrocarbon deposit with a treatment composition, wherein the treatment composition comprises: about 10% to about 25% by weight of one or more mixed fatty acid methyl esters; about 2% to about 15% by weight of an aromatic mixture consisting essentially of $C_9$ to $C_{15}$ aromatic compounds; and a main solvent consisting essentially of low odor kerosene, low odor diesel, or a combination of low odor kerosene and low odor diesel;

b) solubilizing the hydrocarbon deposit with the treatment composition at a temperature in the range of 34° F. to 90° F.;

c) removing the hydrocarbon deposit from the flow line, the wellbore, the vessel, or the other surface.

18. The method of claim 17, wherein the hydrocarbon deposit contains paraffins.

19. The method of claim 17, wherein the hydrocarbon deposit contains asphaltenes.

20. The method of claim 17, wherein the treatment composition is introduced at a concentration in a fluid of at least about 1 oz/barrel.

21. The method of claim 17, wherein the treatment composition is introduced at a concentration in a fluid of about 1 oz/barrel to about 4 oz/barrel.

22. The method of claim 20, wherein a temperature within the flow line, the wellbore, the vessel, or the other surface surrounding the hydrocarbon deposit is about 34° F. to about 60° F.

23. The method of claim 20, wherein a temperature within the flow line, the wellbore, the vessel, or the other surface surrounding the hydrocarbon deposit is about 60° F. to about 90° F.

* * * * *